United States Patent
Tolman (10) Patent No.: US 10,688,367 B2
(45) Date of Patent: Jun. 23, 2020

(54) HINGE FOR GOLF TRAINING AID AND METHOD OF MANUFACTURE

(71) Applicant: ALIGNMENT PRO LLC, Highland, UT (US)

(72) Inventor: Thomas Nathanael Tolman, Mapleton, UT (US)

(73) Assignee: ALIGNMENT PRO, LLC, Highland, UT (US)

(*) Notice: Subject to any disclaimer, the term of this patent is extended or adjusted under 35 U.S.C. 154(b) by 0 days.

(21) Appl. No.: 15/951,100

(22) Filed: Apr. 11, 2018

(65) Prior Publication Data
US 2019/0111328 A1    Apr. 18, 2019

Related U.S. Application Data

(60) Provisional application No. 62/484,837, filed on Apr. 12, 2017.

(51) Int. Cl.
| | |
|---|---|
| A63B 69/36 | (2006.01) |
| F16C 11/10 | (2006.01) |
| A63B 71/02 | (2006.01) |
| A63B 102/32 | (2015.01) |

(52) U.S. Cl.
CPC ...... *A63B 69/3667* (2013.01); *A63B 69/3623* (2013.01); *A63B 69/3641* (2013.01); *F16C 11/103* (2013.01); *A63B 2071/024* (2013.01); *A63B 2102/32* (2015.10); *A63B 2209/00* (2013.01); *A63B 2209/08* (2013.01); *A63B 2210/50* (2013.01); *A63B 2225/09* (2013.01)

(58) Field of Classification Search
CPC .......... A63B 53/02; A63B 53/00; A63B 69/36
See application file for complete search history.

(56) References Cited

U.S. PATENT DOCUMENTS

| | | | |
|---|---|---|---|
| 1,022 | A | 3/1870 | King |
| 1,142,418 | A | 6/1915 | Hamalainen |
| 3,181,366 | A | 5/1965 | Collaro |
| 3,443,811 | A | 5/1969 | Brooks |
| 3,530,723 | A | 9/1970 | Hogue et al. |
| 3,930,432 | A | 1/1976 | Puchy |
| 4,129,301 | A | 12/1978 | Kenney |
| 4,506,408 | A | 3/1985 | Brown |
| 4,900,030 | A | 2/1990 | Houtz |
| D332,815 | S | 1/1993 | Rivas |
| 5,215,306 | A | 6/1993 | Cayce |

(Continued)

FOREIGN PATENT DOCUMENTS

WO    WO2018191342    10/2018

OTHER PUBLICATIONS

Alignment Pro,com, Alignment Pro Golf Training Aid, May 10, 2016, (retrieved from Internet on Aug. 6, 2018) <URL https://alignmentpro.com/products/alignment-pro.

(Continued)

*Primary Examiner* — Alvin A Hunter
*Assistant Examiner* — Christopher Glenn
(74) *Attorney, Agent, or Firm* — Durham Jones & Pinegar, P.C., Intellectual Property Law Group; Sarah W. Matthews (57) ABSTRACT

Hinges for multipurpose golf training aids, and more particularly, long-wearing, durable low-profile hinges for multipurpose golf training aids, and methods for manufacturing such hinges are disclosed.

14 Claims, 5 Drawing Sheets

(56) References Cited

U.S. PATENT DOCUMENTS

| | | | |
|---|---|---|---|
| 5,277,427 A | 1/1994 | Bryan et al. | |
| 5,303,926 A | 4/1994 | Owens et al. | |
| 5,370,396 A * | 12/1994 | Bloom | A63B 69/3632 473/232 |
| 5,489,100 A * | 2/1996 | Potter | A63B 69/3632 403/104 |
| 5,520,391 A | 5/1996 | Howe | |
| 5,885,165 A * | 3/1999 | Krause | A63B 69/3688 473/200 |
| 5,987,704 A | 11/1999 | Tang | |
| D417,479 S | 12/1999 | Mechals, Jr. | |
| 6,206,788 B1 * | 3/2001 | Krenzler | A63B 53/02 473/245 |
| 6,343,998 B1 | 2/2002 | Tarulli | |
| 6,346,050 B1 | 2/2002 | Larson | |
| D460,138 S | 7/2002 | Anzaldua | |
| 6,440,004 B1 | 8/2002 | Rodriguez | |
| 6,729,968 B2 | 5/2004 | Port | |
| 6,949,030 B1 | 9/2005 | Gauer | |
| 7,241,228 B2 | 7/2007 | Bruschi | |
| 7,281,986 B2 | 10/2007 | Tolson | |
| D628,258 S | 11/2010 | Greenberg | |
| 7,997,995 B2 | 8/2011 | Willis | |
| 8,066,582 B1 | 11/2011 | Hauser | |
| 8,277,331 B2 | 10/2012 | Whitt et al. | |
| D708,285 S | 7/2014 | Miller | |
| 9,180,353 B2 | 11/2015 | Chen | |
| 9,810,353 B2 | 11/2017 | Leslie et al. | |
| D810,219 S | 2/2018 | Escamilla | |
| 2002/0037774 A1 * | 3/2002 | Miyamoto | A63B 53/00 473/287 |
| 2004/0179891 A1 | 9/2004 | Watkins et al. | |
| 2005/0096146 A1 | 5/2005 | Burley | |
| 2007/0143962 A1 | 6/2007 | Lu et al. | |
| 2007/0275788 A1 | 11/2007 | Delpine | |
| 2010/0009769 A1 | 1/2010 | Kimball | |
| 2010/0120549 A1 | 5/2010 | Capesius | |
| 2010/0197421 A1 | 8/2010 | Buchenau | |
| 2010/0298060 A1 | 11/2010 | MacDonald | |
| 2015/0031788 A1 | 1/2015 | Zhang | |
| 2015/0217175 A1 | 8/2015 | Carson | |

OTHER PUBLICATIONS

PCT/US18/27034—International Search Report and the Written Opinion of International Searching Authority or the Declaration. International Preliminary Report on Patentability from PCT/US2018/027034, dated Oct. 15, 2019.

* cited by examiner

HINGE FOR GOLF TRAINING AID AND METHOD OF MANUFACTURE

THE FIELD OF THE INVENTION

The present invention relates to a hinge for a multipurpose golf training aid, and more particularly to a long-wearing, durable, water-resistant, and low-profile hinge for a multipurpose golf training aid.

BACKGROUND

It is well-known that there are numerous training aids available to help golfers attempt to improve their golfing game. Some golfers may use simple sticks in order to improve. At a most basic level, many golfers will use one or more sticks to help with the alignment of their swing when hitting the ball. The stick(s) may be placed pointing to the hole to help align the swing relative to the hole, or may be placed in some other position to indicate proper foot position, proper club orientation, proper ration, etc.

Figure 1:
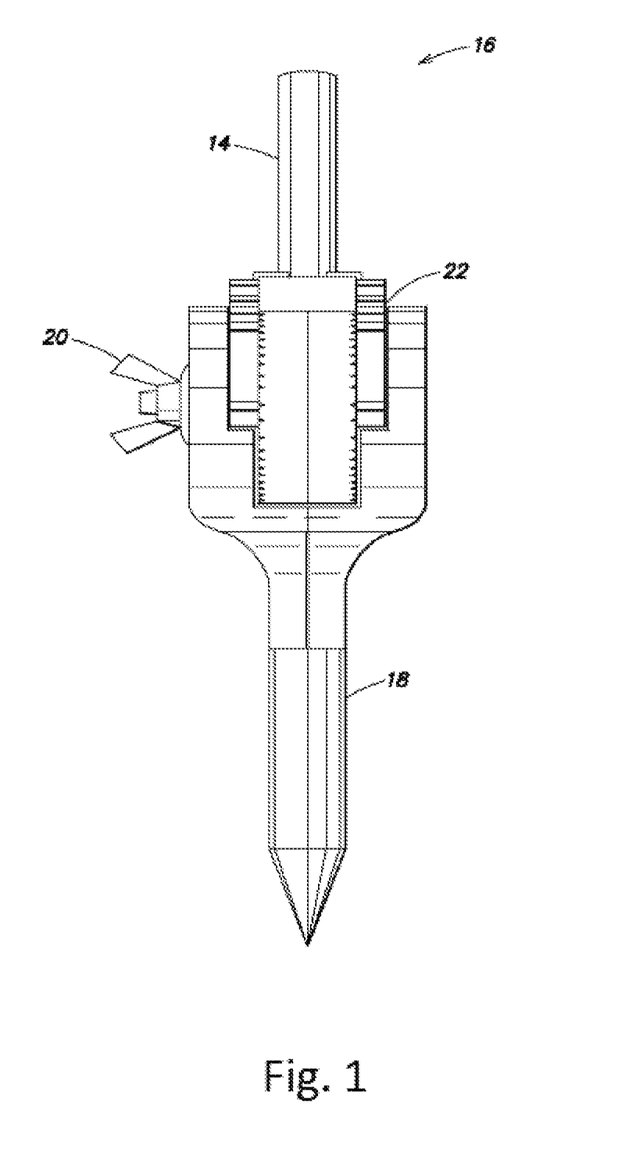
FIG. 1 shows a view of a prior art golf swing training device.

Attempts have been made to provide improved training aids which add additional features above sticks alone. For example, U.S. patent application Ser. No. 12/477,752 to Kimball shows a golf swing training device in which a stick 14 is attached to an end piece 18 with a hinge 22 and a locking nut 20. This allows the angle of the stick 14 and the end piece 18 to be adjusted. Thus, when the end piece 18 is stuck in the ground, the stick 14 can be disposed at a variety of angles to help with swing alignment as shown in FIG. 1 of that reference.

Figure 2:
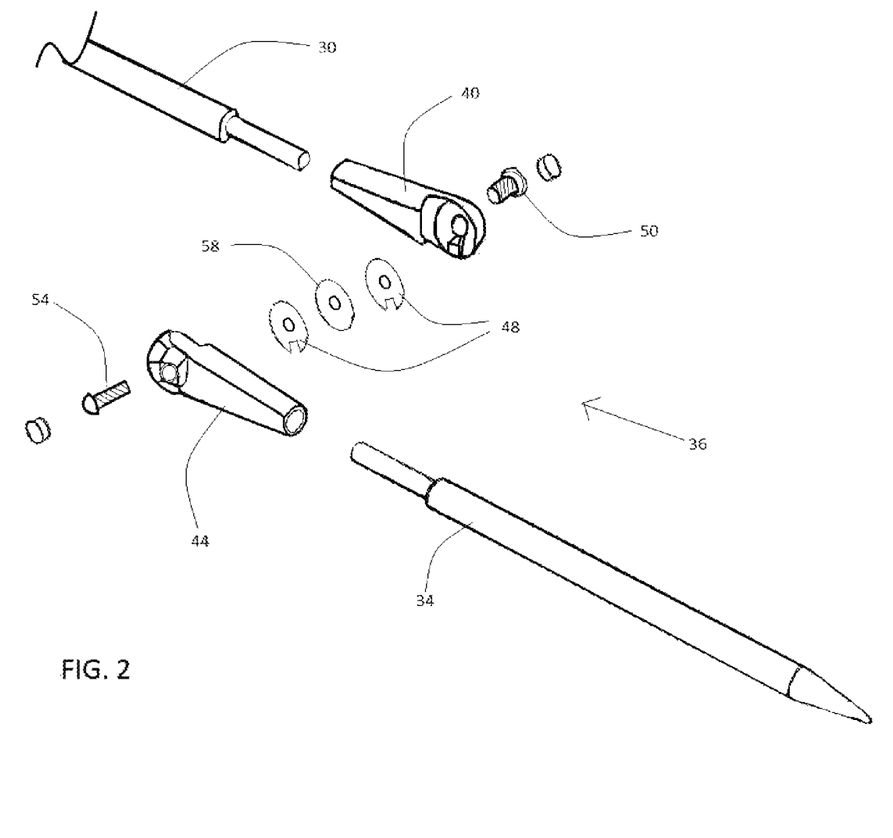
FIG. 2 shows a cross-sectional view of a prior art golf training device having an improved hinge.

A significant improvement was achieved in the Alignment Pro Golf Alignment Rods, an exploded view of which is shown in FIG. 2. Rather than the hinge 36 having to be loosened and retightened each time the user decided to change the orientation of the stick 30 relative to the end piece 34, the Alignment Pro Golf Rods allowed a continuous frictional adjustment in the hinge 36. This was accomplished by a housing 40 attached to the stick and a housing 44 attached to the end piece. Each housing 40, 44 includes a stationary washer 48 with a hole for receiving a pair of mating screws 50, 54. A floating washer 58 is disposed between the other two washers 48. By tightening the mating screws 50, 54, the washers 48 in the housings 40, 44 are brought into frictional contact with the floating washer 58. The tighter the mating screws 50, 54 are applied, the more resistance the hinge 36 provides to movement. Thus, a user can adjust the hinge 36 without the use of tools and at any angle desired between the stick 30 and the end piece 34. Additionally, the Alignment Pro Golf Alignment Rods included a second hinge (not shown) and a second end piece (not shown) at the opposing end of the stick 30.

The use of two self-supporting hinges which can be adjusted without the use of tools and without the need to use (and possibly lose) a wing nut or other locking mechanism—combined with the use of two hinges—makes the Alignment Pro Golf Alignment Rods much more versatile to use. For example, a user may bend both hinged ends down, and insert both ends in the golf turf. This causes the stick to form a table-like shape (with two legs). The golfer can then align their toes with the length of the stick, and pass the head of a putting club under the upper bar of the training device. By watching the movement of the club head relative to the steady plane of the training device, a golfer can determine how close they are to moving the putter to an ideal straight line, or determine whether they are curving or turning their stroke. Because both ends pieces are anchored in the ground, the stick also provides more firm resistance to the club if the user fails to follow the proper movement along the stick.

Alternately, just one end of the training aid can be placed in the ground, and the second end may be angled to point at the golfer's chest. This visual indicator helps a golfer align their chest and head with the ball, and shows a golfer if they are bobbing their head during the swing, and if he is maintaining the proper distance from the ball throughout the stroke.

Alternately, just one end of the training aid may be inserted in the ground, but the remainder of the stick may be suspended in parallel with the ground (e.g. an "L" shape, with the short end inserted in the ground.) This has the advantage of allowing a golfer to pass his or her club under the suspended rail for the full length of a putt. In an ideally straight stroke, the ball would travel directly under the rail for the entire distance of the putt. A golfer can easily see if his putting stroke has any breaks or unevenness because the ball or club may move out of alignment with the rail.

A large number of other golf stances can also be improved by use of a hinged stick. However, the hinge of such a training aid is subject to widely-varying and stressful operating conditions.

For example, the hinge of a golf training aid must be stiff enough to support the entire weight of the stick at any angle, without allowing the stick to slump or give way if accidentally bumped, even in wet conditions. That is to say, the hinge must have sufficient torque. Conversely, the hinge must move easily enough so that the training aid is convenient for use by teenage and women golfers. That is, the hinge torque must not be too great for certain users.

The hinge must be resistant to wear over time, even after a many bending and flexing events, because a user may bend or adjust the ends of the training aid dozens or hundreds of times over the course of just one training session. The hinge must be impervious to moisture, as well as hot and cold conditions, and should function equally well in all environments in which a golfer is likely to use it. The hinge must also be able to undergo long periods of storage (e.g. during the winter) without either growing too stiff to use effectively, or too loose to support the weight of the stick at any angle (i.e., the hinge should have a stable torque force under many conditions.)

In addition, the hinge should also be both low profile and resistant to crushing or other damage. This is because the golf training aid may be repeatedly straightened and jammed into a golf bag, where it may rattle between golf clubs. A high-profile hinge (one which significantly sticks out from the body of the training aid) may become caught or snagged on the lining of the golf bag or golf clubs, damaging the bag or the training aid, or both. Because the golf training aid may be jostled between heavier golf clubs as the bag is carried, the hinge should be resistant to damage.

While the Alignment Pro Golf Alignment Rods are a significant improvement over the cited art, the force necessary to hold the stationary washers 48 in sufficient frictional engagement with the floating washer 58 can be substantial. In an attempt to provide sufficient force that the hinge is self-retaining (i.e. will hold itself at the orientation set by the user) it is not uncommon for the mating screws or their engagement with the housing to break under the stress. Additionally, the floating washer 58 and the stationary washers 48 eventually wear and the hinge must either be retightened or replaced.

Accordingly, there is a need in the art for innovative hinges for golf training aids, and methods of manufacturing hinges suited to use for golf training aids. It is an advantage if the hinge is resistant to degradation as a result of long storage in conditions in heat or cold, even if the hinge is jammed into a golf bag. It is a further advantage if a hinge supports the full weight of the golf training aid at any angle, but is easy enough to bend so that children can use the device. Additionally, it is an advantage if the hinge can be bent and straightened a very large number of times without losing tension. It is also an advantage if the hinge is mostly enclosed, so that grass or debris does not become caught in the joint.

SUMMARY OF THE INVENTION

Embodiments of a golf training aid hinge and methods of manufacture are discussed below. The hinges and methods include a variety of inventive aspects which can be used together to produce a hinged golf training aid that is functional under challenging outdoor conditions. It will be appreciated that various aspects of the invention can be used independently or together and that the invention is set forth in the attached claims rather than the description contained herein.

BRIEF DESCRIPTION OF THE DRAWINGS

Various embodiments and features of golf training aid hinges are shown and described in reference to the following numbered drawings.

It will be appreciated that the drawings are illustrative and not limiting of the scope of the invention which is defined by the appended claims. The embodiments shown accomplish various aspects of the invention. It is appreciated that it is not possible to clearly show each element and aspect of an invention in a single figure, and as such, multiple figures are presented to separately illustrate the various details of embodiments of self-adhesive patches and methods of manufacture in greater clarity. Several aspects from different figures may be used in accordance with parts in a single structure. Similarly, not every embodiment need accomplish all advantages of various embodiments of a hinge for a multipurpose golf training aid.

DETAILED DESCRIPTION

The invention and accompanying drawings will now be discussed in reference to the numerals provided therein so as to enable one skilled in the art to practice the present invention. The skilled artisan will understand, however, that the apparatuses, systems, and methods described below can be practiced without employing these specific details, or that they can be used for purposes other than those described herein. Indeed, they can be modified and can be used in conjunction with products and techniques known to those of skill in the art in light of the present disclosure. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one configuration," "one embodiment," "a configuration," or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Before the present invention is disclosed and described in detail, it should be understood that the present disclosure is not limited to any particular structures, process steps, or materials discussed or disclosed herein, but is intended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a shape" may include one or more of such shapes, and reference to "the backing" may include reference to one or more of such layers.

As used herein, the term "substantially" refers to the complete or nearly complete extent or degree of an action, characteristic, property, state, structure, item, or result to function as indicated. For example, an object, such as tubing, that is "substantially" enclosed would mean that the object is either completely enclosed or nearly completely enclosed. The exact allowable degree of deviation from absolute completeness may in some cases depend on the specific context, such that enclosing nearly all of the length of a piece of tubing would be substantially enclosed, even if the distal end of the structure enclosing the tubing had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it lacked a bottom.

Likewise, the term generally is used to identify a situation in which some is close enough that it would commonly be considered to be a described feature, position, etc., even though it is not exactly so. For example, a structure may be said to be generally cut to right angles even though the angle is not exactly 90 degrees. In other words, an angle of 80 degrees may be said to be generally at right angles. The exact range will be determined by the ordinary usage of a person of ordinary skill in the art.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIGS. 1 and 2 there are shown two presently known golf training aids. While FIG. 1 shows an improvement to the conventional putting stick used for working on proper swing alignment, FIG. 2 shown an improved aid which removes the need to loosen or tighten a nut when adjusting the device. The hinge in FIG. 2 is also not a bulky, knob-like device with projections which can catch on a golf bag, etc. However, it has been found that the hinge design of FIG. 2 can be substantially improved.

Figure 3:
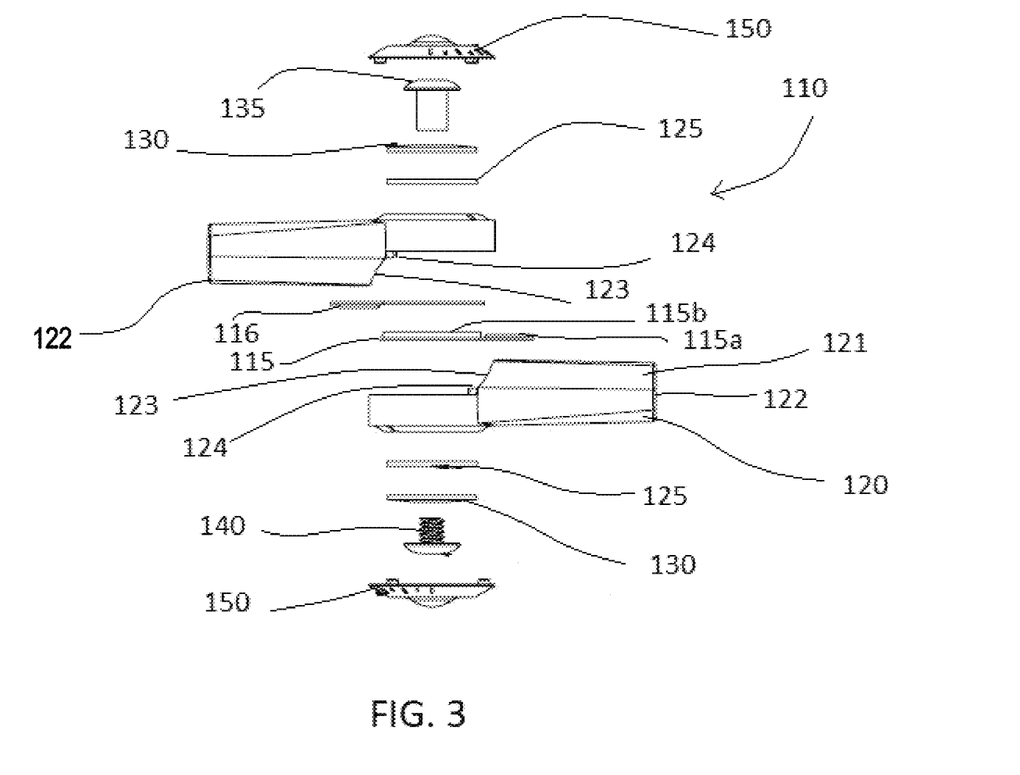
FIG. 3 shows an exploded view of one embodiment of a hinge made in accordance with the present disclosure.

Turning now to FIG. 3, there is shown an exploded view of one embodiment of a hinge assembly (indicated generally at 110) for a multipurpose golf training aid, made in accordance with the present disclosure. The hinge assembly 110 may include a frictional brake pad 115. The frictional brake pad 115 may include an arm 115a which anchors or otherwise supports engagement between the brake and a hinge body discussed below.

The frictional brake pad 115 may be, for example, a stainless steel washer coated with a friction enhancing material 115b. An example of a friction enhancing material 115b is copper-reinforced aramid. An aramid (aromatic polyamide) is typically a heat-resistant manufactured fiber comprised of a long-chain synthetic polyamide, in which the majority of the amide links (—CO—NH—) are attached directly to two aromatic rings. Aramids are typically used in body armor and flame-resistant clothing. However because of the fiber-like, longitudinal structure, thin coats of aramid may form a long-wearing, micro-corrugated surface with a high friction coefficient, suitable for use as a braking material. Copper-reinforced aramids may have a friction capability in excess of 80 pound-force (lbf), depending on the pressures to which they are subjected.

It will be appreciated that other types of materials may be used for the friction enhancing material 115b on the frictional brake pad 115, including carbon ceramic, cellulose, sintered glass, and the like. Such materials must be selected carefully, however, for durability, consistent wear, and smoothness. Some types of materials may produce excess dust when used as frictional brakes (especially in a hinge that may be jostled or banged within the golf bag), which results in a hinge which pulses, is grabby, has chatter, or otherwise has uneven resistance as the hinge is bent. Dustless or nearly dustless materials create a smoother user experience, and may prevent the golf training aid from unexpectedly slumping when, for example, one end is inserted into turf so that the training aid extends upwards at a 45-degree angle, etc.

The surface area of the friction portion of the frictional brake pad 115 may be, for example, between about 0.15 in$^2$ and 0.8 in$^2$. While smaller frictional surfaces can result in a slimmer and lighter-weight hinge, they may be more susceptible to the infiltration of debris or dust, and a larger amount of pressure must be applied in order to maintain the desired torque.

While the pictured embodiment includes one frictional brake pad 115, it will be appreciated that a pair may be used, or a drum brake or axial friction plate may be used, or other means of applying a frictional braking force to achieve the desired torque, or the amount of twisting force needed to open or close the hinge. Torque may be measured in, for example, inch-pounds (in-lb) or as torque friction coefficient (K)

In general, the most effective torque must be sufficient to hold the golf training device at an angle without allowing for slumping, as discussed above, in inclement weather conditions. While this value may vary depending on the weight and length of the golf training aid, a typical golf training aid should have a torque of at least 10 in-lbs, with a torque coefficient of approximately 0.4. At 15 in-lbs, the pictured hinge may have a weight support capacity of approximately 290 grams (placed at the end of the suspended hinge, when one end (FIGS. 1 & 2) is inserted into the grass or a holder, and the remainder of the golf training aid is adjusted to stand at a 45-degree angle versus the ground.) Thus, an accidental bump or movement should not cause the angle of the golf training aid to change.

Conversely, the torque must not be so high that women, teenaged, or senior golfers, or physically handicapped golfers, cannot conveniently use the golf training aid. Torque forces in excess of 23.0 in-lbs may be difficult for these individuals to use.

Torque forces may be increased or decreased by altering the pressure applied to the frictional brake pad or pads 115, and a washer or friction plate 116. The friction plate 116 may be, for example, simply a stainless steel washer, or other surface against which the frictional brake pad 115 can apply friction or a braking force. The friction plate 116 may likewise include an arm 116a which extends into a second hinge body, discussed below, to hold the friction plate 116 in place.

A vise-like pressure may be applied to the frictional brake pad 115 and the friction plate 116 by use of an attachment or clamping mechanism, including but not limited to a bolt and nut, a pair of mating screws, a force distributing device, single or a plurality of friction surfaces and a spring device. This force may be applied evenly across the entire friction surface area, or to apply force in a gradient across the surface. In some embodiments, it may be advantageous to apply the force in a gradient, because an uneven match between the frictional brake pad 115 and friction plate 116 may improve the clearance of any dust or debris which may otherwise accumulate between the frictional brake 115 pad and friction plate 116.

In the pictured embodiment, the clamping mechanism may include a female threaded screw 135 and a male threaded screw 140 with the exterior threads of the male threaded screw 140 engaging the interior threads of the female threaded screw 135. The screws 135, 140 may extend through openings (not shown) in the frictional brake pad 115 and the friction plate 116, so that the frictional brake pad 115 and the friction plate 116 are held together more tightly when the male threaded screw 140 is tightened.

In some embodiments, the pressure thus applied may be adjustable by the user; for example, a user may be able to tighten or loosen the male threaded screw 140. A user may thus select the desired torque between about 0 and 23 in-lbs, presuming a copper-aramid brake surface and a frictional surface area of about one inch-squared. In other embodiments, the attachment mechanism may be pre-selected to set the hinge torque to between about 11-15 in-lbs., so that right out of the box, the golf training aid is suitable for most users. In some embodiments, the attachment mechanism may be fixed; for example the female threaded screw 135 and the male threaded screw 140 may be welded together once the desired torque is obtained, rendering the hinge more weather and rain-resistant.

Over time and with repeated use, however, the frictional brake pad 115 may suffer wear, gradually becoming thinner. Alternately, the screws 135 and 140 may be loosened with repeated use. This may result in a hinge which slowly loses torque over time, until it cannot hold the golf training aid at the correct angle in some conditions.

In order to extend hinge torque life through the friction surface mass loss due to abrasion and wear, the hinge assembly 110 may be equipped with one or more expandable members or torque-retention members or force distributing devices 130 which can form part of the clamping mechanism. Force distributing devices 130 may be, for example, springs or springing members such as spring washers, vice or clamping mechanisms such as a slender bolt, or may be magnetic elements such as neodymium magnets. The force distributing devices 130 may keep the elements of the hinge assembly 110 (e.g. the frictional brake pad 115 and the friction plate 116) properly frictionally engaged or pressed together even if the frictional brake pad 115 wears thin over time. The force distributing devices 130 may be separated from the braking elements by separating mechanisms 125, such as floating washers, so that the torque-retention members or force distributing devices 130 do not directly contact the braking mechanism formed by the frictional brake pad 115 and friction plate 116. This has the advantage of reducing wear on the force distributing devices 130.

As the frictional brake pad 115 and the friction plate 116 wear, the spring washer or other force distributing device 130 keeps them in frictional contact due to the biasing of the force distributing devices 130. Such a configuration allows for significantly more wear than in the prior art before requiring tightening of the screws 135, 140 of other force application devices.

The hinge assembly 110 may also include hinge body elements 120 which connect the hinge body to the stick and an end piece of an alignment device. In some embodiments, the hinge body elements 120 may provide some weatherizing protection to the frictional brake pad 115, the friction plate 116 and the force distribution devices 130, etc. In addition, the hinge body elements 120 may include fins 121, which may physically prevent the hinge from rotating beyond approximately a 90-degree angle, thus keeping the golf training device square and level when both ends are inserted in the ground or holders. The hinge body elements 120 may include an anchoring apparatus or pocket 122 which may engage the end (see FIG. 4) of the golf training aid, so that the end does not slip or twist out of alignment with the hinge assembly 110. The hinge body elements 120 may further include an inclined or curved surface 123 which matches the curvature of the opposing hinge body element 120 and gap-reducing member 124 in order to further limit the rotation of the hinge and also minimize any gap when the hinge is rotated. This may reduce the chance of a finger being pinched in the hinge, or grass or other debris being caught in the hinge.

The hinge assembly 110 may be covered with one or more hinge body caps or weatherizing caps 150. The caps 150 may reduce the infiltration of grass or other debris into the hinge, and may additionally provide indicator markings, so that a user may adjust the hinge to the desired angle. Thus, for example the caps 150 may show 15 degree increments so that the user knows approximately at what angle the stick is extending relative to the end piece.

Figure 4:
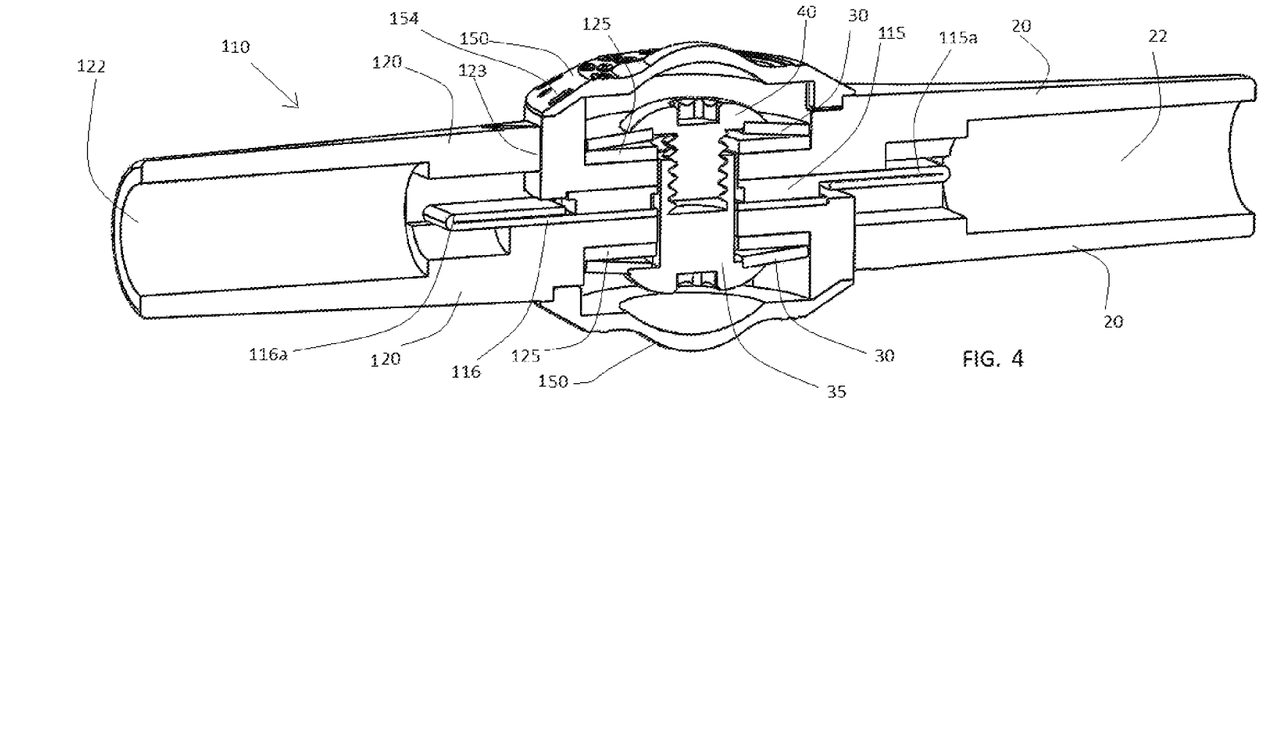
FIG. 4 shows a cut-away view of one embodiment of a hinge made in accordance with the present disclosure.

Turning now to FIG. 4, there is shown a cut-away view of one embodiment of an assembled hinge assembly, generally indicated at 110, made in accordance with some aspects of the present disclosure and the embodiment of FIG. 3. The hinge assembly 110 may include a frictional brake pad 115 biased against a friction plate or washer surface 116. The frictional brake pad 115 is supported in place by the arm 115a which extends into a hinge body element 120. The friction plate 116 is held in place by the arm 116a which extends into the other hinge body element 120. The arms 115a and 116a may be doubled over to provide additional rigidity and support.

As the hinge is pivoted back and forth, the frictional brake pad 115 and the friction plate 116 engage to form a friction hinge which allows movement without tools or the adjusting of nuts, etc., while retaining the hinge body elements 120 in a desired orientation to one another when the user is not applying force thereto.

The hinge body elements 120 include pockets 122 for holding one of the stick or an end piece similar to those shown in FIG. 2 above. The pockets 122 may be oval-shaped in cross-section, rather than circular, so that the end of a stick or end piece may fit more snugly into the pockets. Additionally, the curved or inclined edge 123 of the hinge body element 120 may match closely with the opposing shape of the opposing hinge body element 120, so that any gap when the hinge is opened or closed may be minimized.

The frictional brake pad 115, friction plate or surface 116, and hinge body elements 120 may be clamped together and the tension maintained by a connectors, such as the screws 135 and 140, (FIG. 4 shows the engagement between the threads of the male screw 140 and the female screw 135) and one or more biasing element or expandable member 130— such as a pair of spring washers in the pictured embodiment. The force of the biasing elements 130 may be applied to floating washers 125 which sit between the biasing elements 130 and a portion of the hinge body elements 120, thereby holding the hinge body elements 120 adjacent each other and compressing the brake formed by the frictional brake pad 115 and the friction plate 116. The hinge assembly 110 may be covered by a hinge cap or weatherizing cap 150, which may include markings or indicators 154 so that a user may close the hinge to the desired angle, up to around 90-degrees.

Figure 5:
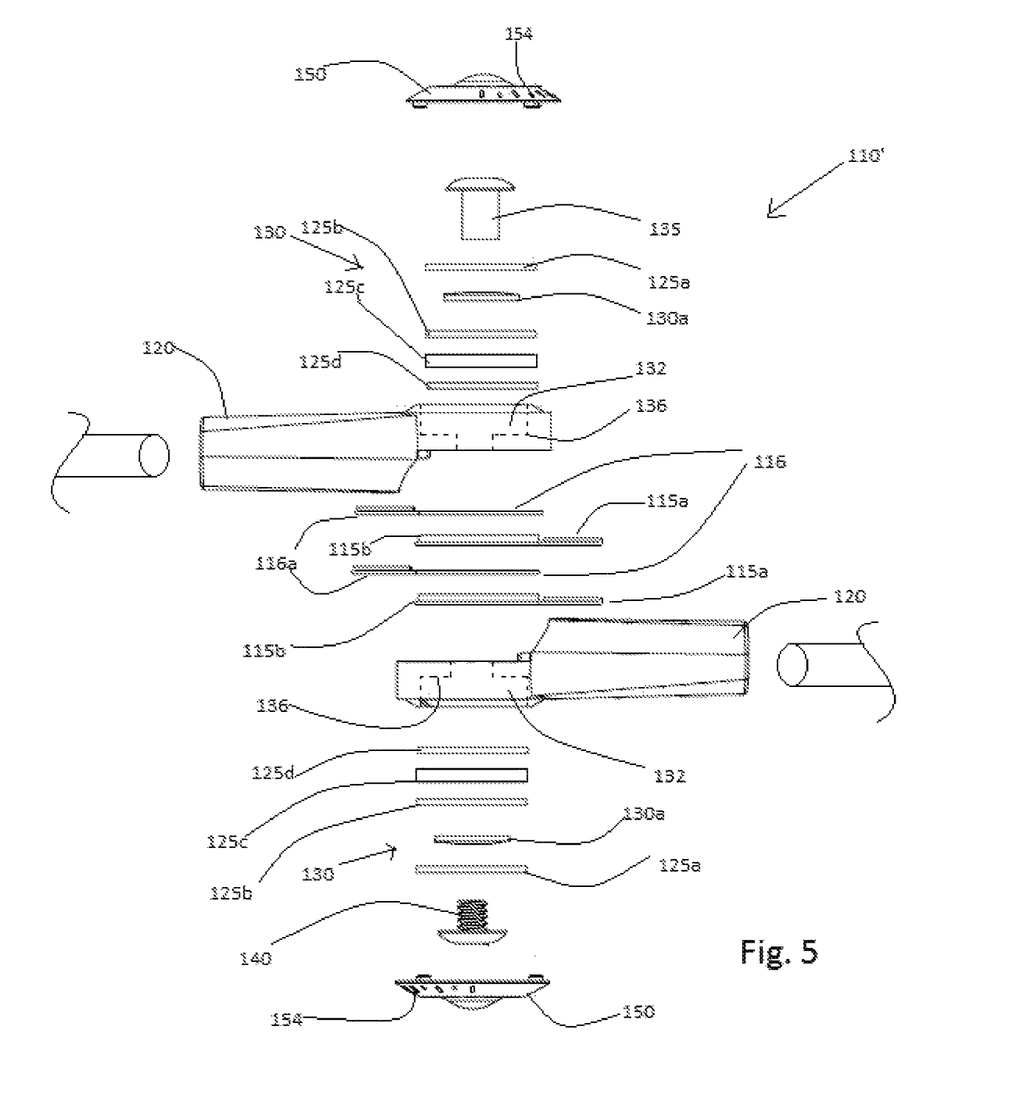
FIG. 5 shows an exploded view of an alternate embodiment of a hinge.

Turning now to FIG. 5, there is shown an exploded view of an alternate embodiment of a hinge assembly, generally indicated at 110'. The hinge assembly 110' may include a first brake pad 115 and a second brake pad 115. Both of the brake pads 115 may include a support arm 115a for engaging a hinge body element 120 and hold the brake pads 115 in place.

The hinge assembly 110' may also include a first friction plate 116 and a second friction plate 116. Each friction plate may include an arm 116 for disposition in the other hinge body element 120 to support the friction plates. In FIG. 5, the brake pads 115 are attached to one hinge body element, while the friction plates are connected to the other. It will be appreciated, however, that such an orientation is not required. Each side could have a brake pad 115 and a friction plate 116. Moreover, it will be appreciated that any of these structures could form a brake pad 115 on one side and a friction plate 116 on an opposite side. Moreover, there need not be an even number of brake pads 115 or friction plates 116. For example, a brake pad 115 could be used between two friction plates 116 or vice-versa.

As shown in FIG. 5, the brake pad(s) 115 and friction plate(s) 116 may be engaged directly by the hinge body elements 120. Alternatively, a washer could be disposed between the pads/plates and the hinge body elements 120.

The embodiment shown in FIG. 5 has multiple additional parts. In addition to a retention mechanism such as the female screw 135 and the male screw 140, the biasing element 130 may be formed in a variety of ways. A singe spring washer or spring washers 130a may be used on both sides of the hinge assembly 110'. Moreover, multiple spring washers 130a could be used on either or both sides. Thus, for example, washers 125a could be spring washers 130a.

Additional floating washers 125b, 125c and 125d may be used on one or both sides of the hinge assembly 110' For example, in a presently preferred embodiment, the spring washer 130a engages a first metallic washer 125b. A first synthetic washer 125b is sandwiched between the first metallic washer 125b and a second metal washer 125d. Thus, as shown in FIG. 5, there are 5 washers 130a, 125a, 125b, 125c and 125b, held between the head of the screw (135 or 140 respectively), and the bottom 136 of a recess 132 formed in a respective hinge body element 120. It will be appreciated that each of the washers 130a, 125a, 125b, 125c and 125b and the hinge body elements 120 will generally have a void for allowing the screws 135 and 140 to extend therethrough.

It has been found that these configurations disclosed herein provide an improved hinge for a golf training aid. The hinge can be easily moved to change the respective orientations of the stick and end piece attached to the hinge body elements 120, and yet the hinge will hold the two in place even when bumped or subjected to strong weather. Moreover, initial production suggests that the new hinge will last substantially longer than the prior art hinge discussed above while improving function.

Thus, there is disclosed a golf training aid hinge and methods of manufacture. It will be appreciated that numerous changes may be made to the above-disclosed embodiments of patches and associated methods without departing from the scope of the claims. The appended claims are intended to cover such modifications.

What is claimed is:

1. A golf training aid hinge assembly, comprising:
   at least one friction plate having an arm;
   at least one frictional brake pad disposed in contact with the at least one friction plate, the at least one frictional brake pad having an arm;
   an attachment member and a biasing member for holding the at least one friction plate in contact with the at least one frictional brake pad; and
   a first hinge body element and a second hinge body element; and
   wherein the arm of the at least one friction plate extends into one of the first hinge body element and the second hinge body element;
   wherein the arm of the at least one frictional brake pad extends into one of the first hinge body element and the second hinge body element.

2. The golf training aid hinge assembly of claim 1, wherein the attachment member includes a threaded member for enabling adjustment of a pressure applied by the attachment member to the biasing member.

3. The golf training aid hinge assembly of claim 2, wherein the at least one frictional brake pad comprises copper-reinforced aramid.

4. The golf training aid hinge assembly of claim 2, wherein the at least one frictional brake pad includes a first frictional brake pad and a second frictional brake pad and wherein the at least one friction plate is disposed between the first frictional brake pad and the second frictional brake pad.

5. The golf training aid hinge assembly of claim 2, wherein the at least one friction plate includes a first friction plate and a second friction plate and wherein at least one frictional brake pad is disposed between the first friction plate and the second friction plate.

6. The golf training aid hinge assembly of claim 1, wherein the biasing member comprises a spring washer.

7. The golf training aid hinge assembly of claim 1, wherein the first hinge body element comprises an anchoring pocket, the anchoring pocket having a cross-section, the cross-section having a width and a height, the width and the height being unequal.

8. The golf training aid hinge assembly of claim 1, wherein the first hinge body element comprises a fin.

9. The golf training aid hinge assembly of claim 1, further comprising a weatherizing cap.

10. The golf training aid hinge assembly of claim 1, further comprising at least one force distributing device.

11. The golf training aid hinge assembly of claim 10, further comprising at least one separating mechanism between the at least one force distributing device and the at least one frictional brake pad.

12. The golf training aid hinge assembly of claim 11, wherein the at least one separating mechanism comprises at least one floating washer.

13. The golf training aid hinge assembly of claim 1, wherein the biasing member applies a biasing force and wherein the biasing force produces a torque between about 12 and 20 in-lbs.

14. A golf training aid hinge assembly, comprising:
   a first friction plate and a second friction plate, each of the first friction plate and second friction plate having an arm;

a first frictional brake pad disposed in contact with the first friction plate and second friction plate, the first frictional brake pad having an arm;

an attachment member and a biasing member for holding the first friction plate and second friction plate in contact with the first frictional brake pad; and a first hinge body element and a second hinge body element; and wherein the arm of the first friction plate extends into one of the first hinge body element and the second hinge body element; and wherein the arm of the first frictional brake pad extends into one of the first hinge body element and the second hinge body element.

* * * * *